(12) United States Patent
Huffman et al.

(10) Patent No.: US 7,367,090 B2
(45) Date of Patent: May 6, 2008

(54) FITTING FOR WIRE ROPE

(75) Inventors: Joseph L. Huffman, Mukwonago, WI (US); Harvey J. Kallenberger, Wind Lake, WI (US); Rikos A. Kasim, Mukwonago, WI (US)

(73) Assignee: Harnischfeger Technologies, Inc., Wilmington, DE (US)

( * ) Notice: Subject to any disclaimer, the term of this patent is extended or adjusted under 35 U.S.C. 154(b) by 187 days.

(21) Appl. No.: 11/177,461

(22) Filed: Jul. 8, 2005

(65) Prior Publication Data

US 2007/0006428 A1  Jan. 11, 2007

(51) Int. Cl.
*B16G 11/04* (2006.01)
*F16G 11/00* (2006.01)

(52) U.S. Cl. .................... 24/122.6; 24/122.3; 403/369; 403/368; 294/82.1

(58) Field of Classification Search .................... None
See application file for complete search history.

(56) References Cited

U.S. PATENT DOCUMENTS 1,894,389 A * 1/1933 Zapf ........................... 29/461
3,846,033 A * 11/1974 Smollinger ................. 403/220

* cited by examiner

*Primary Examiner*—Jack W. Lavinder
(74) *Attorney, Agent, or Firm*—James Earl Lowe, Jr.

(57) ABSTRACT

A fitting for a wire rope with a diameter, the fitting including a stiff support and being adapted to hold and to attach the wire rope to the stiff support, the fitting further comprising an elongated flexible enclosure adapted to surround the wire rope, the flexible enclosure having a length more than 2 times longer than the diameter.

18 Claims, 4 Drawing Sheets

FITTING FOR WIRE ROPE

BACKGROUND OF THE INVENTION

This invention relates to fittings for attaching a metallic wire rope or structural strand end (both hereinafter referred to as a wire rope) to a support.

It is well known to provide a socket end fitting which is permanently anchored to the end of the rope by the latter being received within a through bore of the fitting with the strands of the rope preferably being spread within a divergent part of said bore, the end being secured therein by running molten solder spelter into the bore through the end remote from the main part of the rope, or by clamping the end of the wire rope within the fitting.

On mobile lifting and excavating equipment, one such type of equipment being a dragline, the ropes that extend between the A-frame and the mast and between the mast and the boom are usually attached to the structures (A-frame, mast and boom) by such a socket fitting. The constant change in the tension in the strands results in the wire rope oscillating up and down (and sideways to an extent). Since the socket fitting is so much heavier per unit length and stiffer than the wire rope, the wire rope will bend at the point where it exits the socket fitting. This will eventually lead to wire breakage and, ultimately, rope failure. To reduce the amount of wire breakage where the rope exits the socket fitting, the rope manufacturers have come up with a damper design which basically is a cylindrical piece of steel about several rope diameters in length that surrounds the wire rope and that is bolted to a flange on the socket fitting. In between the damper and the socket fitting is a non-metallic material that is like a thick soft gasket. The wire rope extends through the damper and the gasket before it enters the fitting. In theory, the gasket will compress to 'damp' the motion of the strands in the wire rope. This however has not been very successful in extending the useful life of the rope an appreciable amount.

SUMMARY OF THE INVENTION

One of the principal objects of the invention is to provide a fitting that allows for a nice gradual stiffness change between the wire rope and the socket fitting, thereby reducing the amount of wire damage and increasing the useful life of the wire rope.

More particularly, the invention is in the form of a fitting for a wire rope with a diameter, the fitting including a stiff support and being adapted to hold and to attach the wire rope to the stiff support, the fitting further comprising an elongated flexible enclosure adapted to surround the wire rope, the flexible enclosure having a length more than 2 times longer than said diameter.

Figure 1:
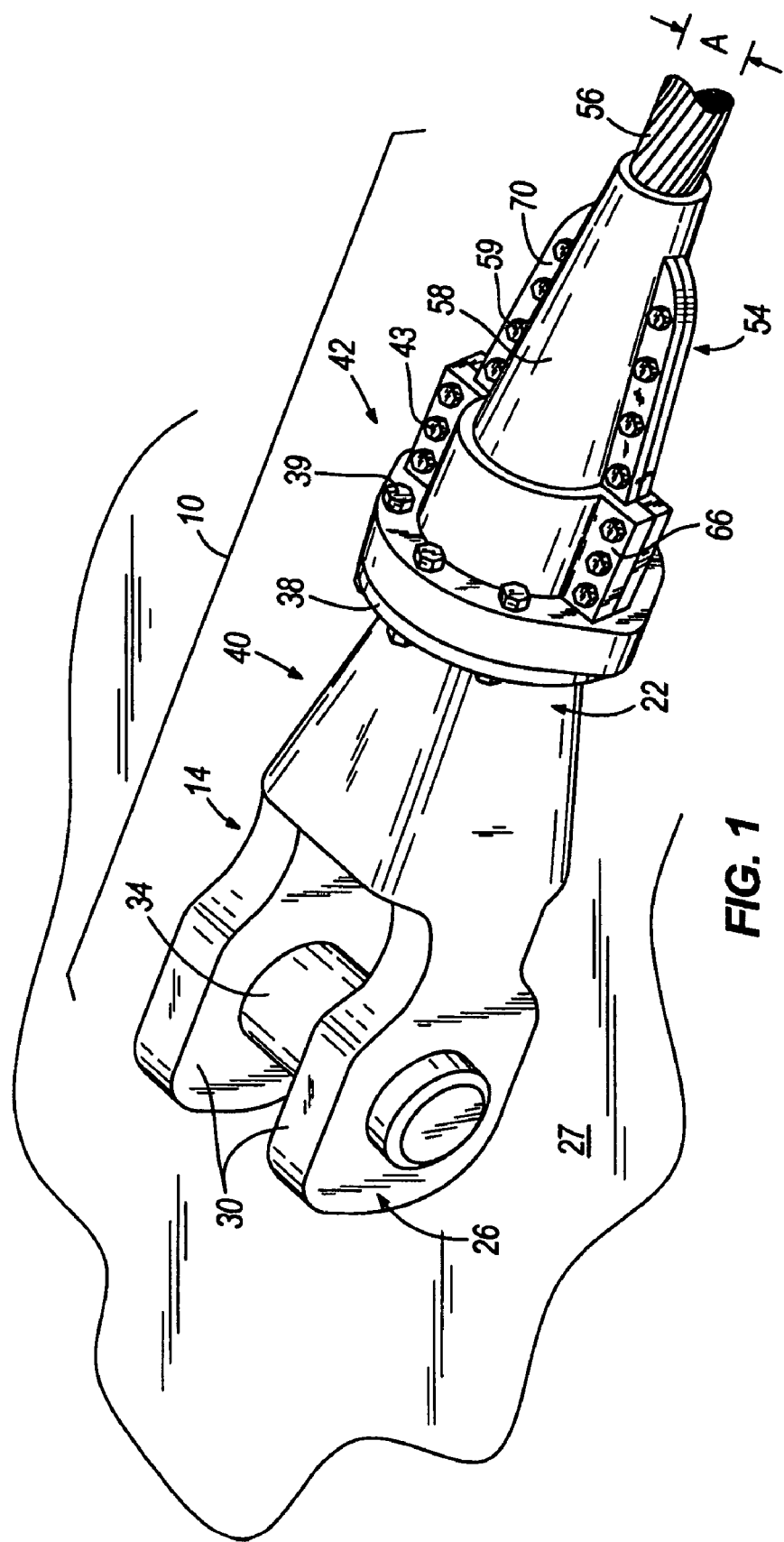
FIG. 1 is a perspective view of the fitting for a wire rope in accordance with this invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward" and "downward", etc., are words of convenience in reference to the drawings and are not to be construed as limiting terms.

DETAILED DESCRIPTION OF THE PREFERRED EMBODIMENT

Figure 2:
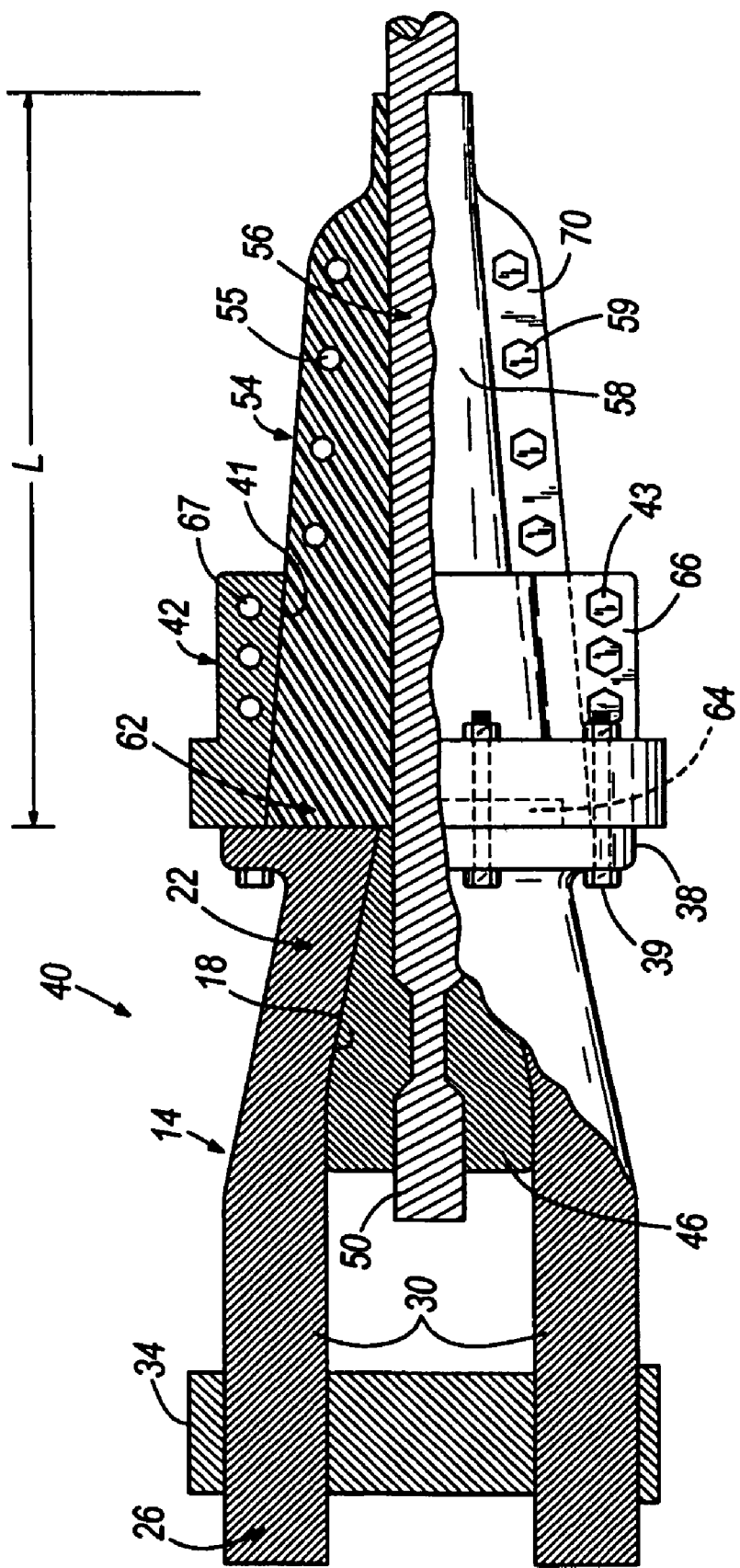
FIG. 2 is a top view, partially broken away, of the fitting shown in FIG. 1.
Figure 3:
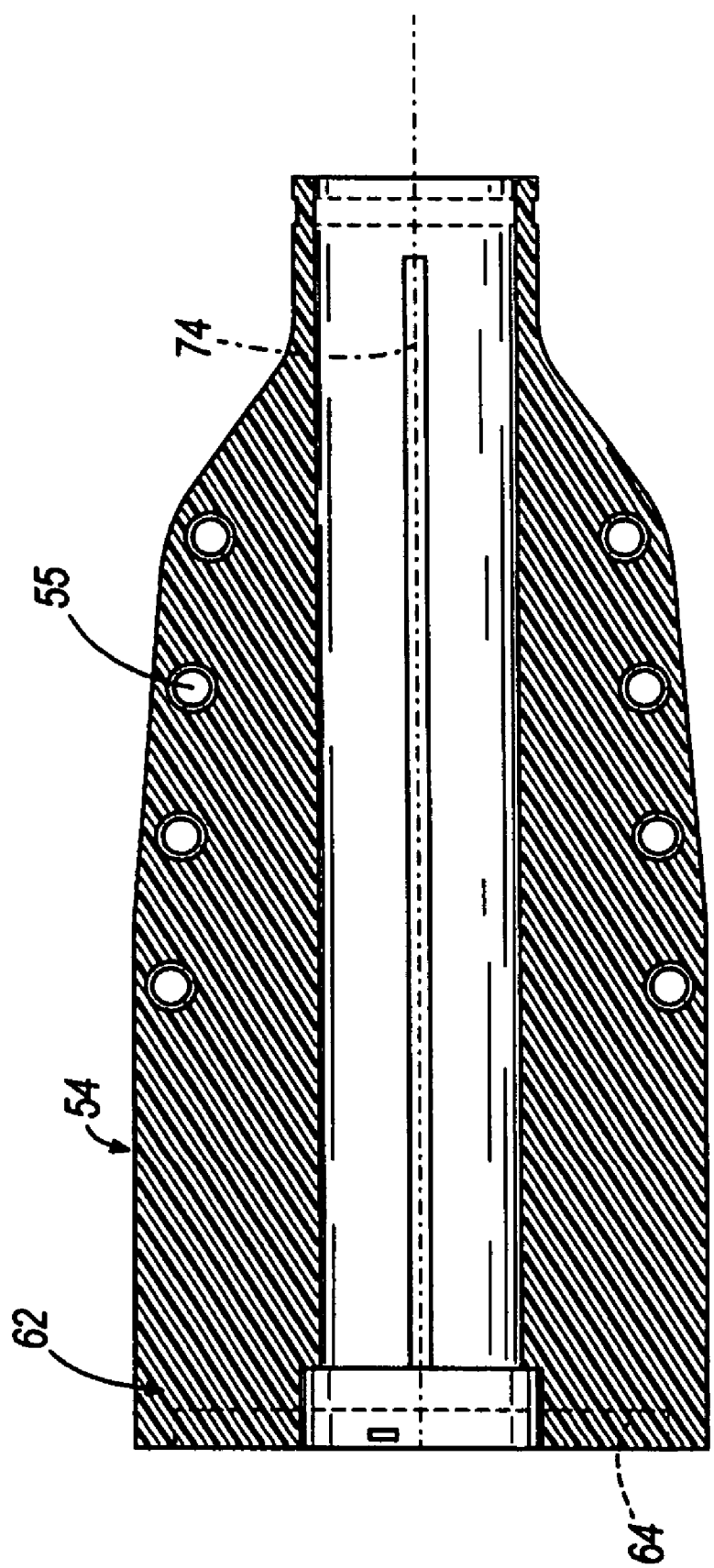
FIG. 3 is a top view of the bottom half of the fitting flexible enclosure.

As illustrated in FIGS. 1, 2 and 3, the invention is a fitting 10. The fitting 10 includes a stiff support 40 and an elongated flexible enclosure 54 adapted to surround a wire rope 56 with a diameter A, as shown in FIG. 1. The fitting 10 is adapted to hold and to attach the wire rope 56 to a structure 27.

The stiff support 40 has an opening 41 therein (see FIG. 2), and the elongated flexible enclosure 54 is adapted to be held in the support opening 41. In the illustrated embodiment, the stiff support 40 is in the form of a collar 42 and a conventional anchor or support bracket 14 intended to be secured by a clevis pin 34 to a lug (not shown) on the structure 27, such as a dragline, a mining shovel, or other equipment where a wire rope can be subjected to loads that could result oscillatory movement of the wire rope relative to the fitting.

More particularly, the support bracket 14 is in the form of a conventional frusto-conical socket fitting. The support bracket 14 has a through passage, with one end having an internal tapered socket 18, with the narrow end of the socket 18 at one end 22 of the support bracket 14. The other end 26 of the support bracket 14 forms two spaced-apart clevis ears 30, with two aligned openings through the ears 30 that receive the clevis pin 34. The support bracket narrow end 22 has a radially outwardly extending flange 38. Openings spaced around the support bracket flange receive bolts 39 to secure the collar 42 to the support bracket 14. In other embodiments (not shown), other open or closed end support brackets can be used.

Various means can be used to secure the wire rope 56 in the support bracket socket 18. In the illustrated embodiment, as shown in FIG. 2, a tapered split clamp 46 fits inside the tapered socket 18 and holds the wire rope end 50. The socket 18 holds the two clamp pieces 46 together and causes the clamp collar 46 to hold the wire rope end 50. In another embodiment (not shown), the end of the wire rope can be anchored in the anchor bore by having its strands splayed and secured in a known manner by spelter or a non-metallic compound with access for this purpose through the open distal portion of the bore.

As mentioned earlier, the stiff support 40 is the support bracket 14 and the collar 42, and is made of metal, such as steel. In other embodiments, the stiff support 40 can be made of any material stiffness substantially greater than that of the flexible enclosure 54. In other embodiments (not shown), the stiff support can be a plate, and the flexible enclosure can be held in an opening through the plate.

More particularly, the flexible enclosure 54 has a length L (as shown in FIG. 2) more than 2 times longer than the diameter A of the wire rope. Still more particularly, in the preferred embodiment, the flexible enclosure 54 is at least 6.5 times the diameter A of the wire rope, or about 32 inches (51.5 cm) long, and the wire rope diameter is about 4.75 (12.1 cm) inches. The enclosure outer surface 58 is tapered, and the larger end 62 of the tapered enclosure 54 is attached to the socket bracket 14 by enclosure attaching means in the form of the collar 42.

The flexible enclosure 54 further has a raised radial flange 64 on the larger end 62 of said enclosure 54, as shown in FIG. 3. The flange 64 is used by the attaching means by fitting into a counter bore indentation (not visible) in the stiff collar 42 that envelops the enclosure 54.

In the preferred embodiment, the flexible enclosure 54 is made of an elastomer toughened thermoplastic material, and the collar 42 is made of steel. More particularly, the flexible enclosure 54 is made of two components mixed together and cured, the two components comprising one component made of caprolactam and a prepolymer in the form of a polyl based on polyether. The other component is made of a curing catalyst and caprolactam. Still more particularly, the flexible enclosure 54 is made from Nyrim 2000 or Nyrim 3000, a trademarked material sold by Bruggemann Chemical.

Both the enclosure 54 and the collar 42 are made in 2 halves so that they can be installed on existing fitting assemblies. The enclosure halves are bolted together using the holes 55 in the flanges 70. More particularly, in the preferred embodiment, the enclosure 54 is split into two pieces that are adapted to be secured together around the wire rope 56, and bolts 59 are received in the holes 55. The stiff collar 42 has the inside tapered bore or opening 41 that mates with the tapered exterior surface 58 on the enclosure 54. In the preferred embodiment, the collar 42 is about 10.5 inches (26.7 cm) long.

In other embodiments (not shown), the flexible enclosure can be a hollow solid (not split) cone or cylinder (or other tapered shape) slipped over the end of the wire rope, but in the preferred embodiment, the flexible enclosure 54 is a cone split into two pieces that can be placed over the wire rope 56 and then secured together. Similarly, in other embodiments (not shown), the stiff collar can be a hollow solid (not split) component slipped over the flexible enclosure prior to it being slipped over the end of the wire rope, but in the preferred embodiment, the stiff collar 42 is a collar split into two pieces that can be placed over the flexible enclosure 54 and then secured together.

As shown in FIG. 3, the enclosure 54 also has a grease groove 74 that extends inside substantially the length of the interior of the enclosure 54. In other embodiments (not shown), the grease groove can be omitted.

In other embodiments (not shown), the collar can be an integral collar, in the form of either a solid hollow cone or a cylinder, slipped over the flexible enclosure 54, but in the preferred embodiment, it is a stiff collar split into two pieces that are secured together around the enclosure 54.

Figure 4:
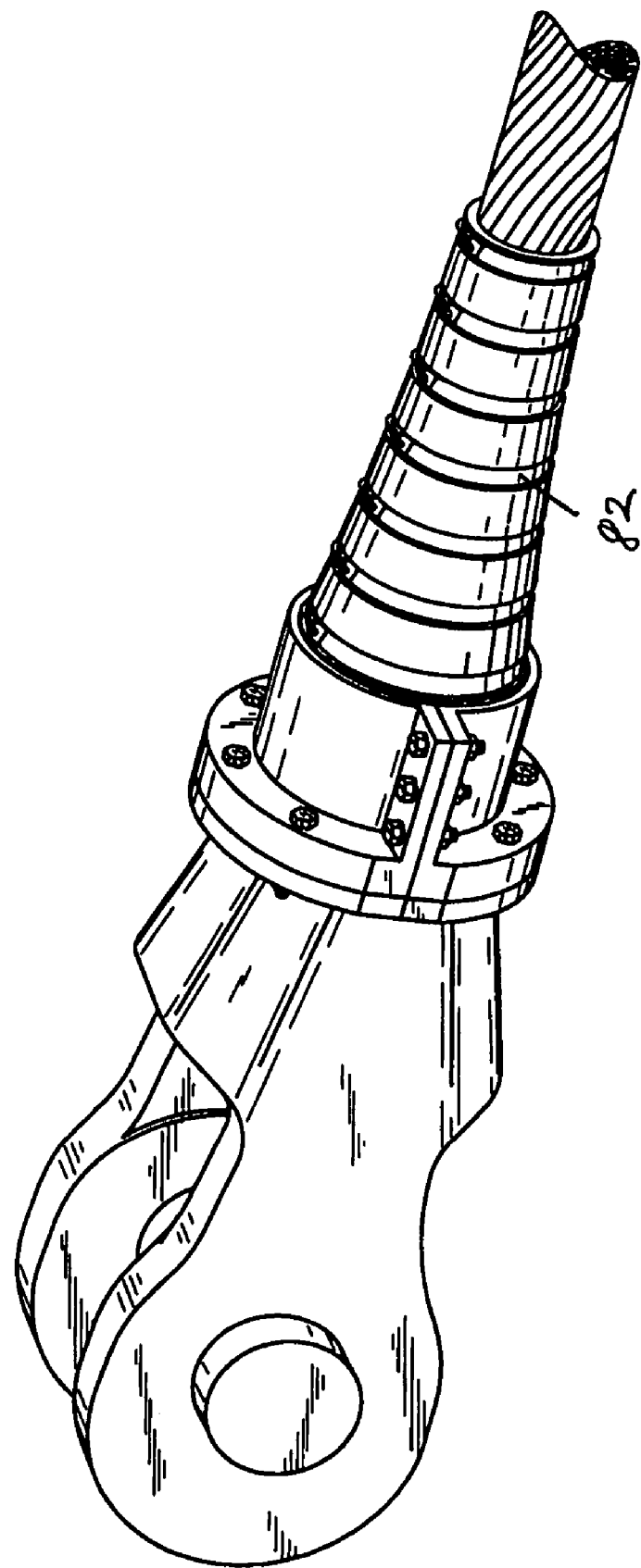
FIG. 4 is a perspective view of an alternate embodiment of a fitting for a wire rope in accordance with this invention.

The stiff collar 42 inside tapered bore 41 mates with the tapered exterior surface 58 on the enclosure 54, and the collar 42 further includes means for securing the collar split pieces together. The collar 42 securing means is in the form of each of the collar pieces having a radially outwardly extending flange 66 extending the length of the collar 42, and bolts that pass through openings 67 in the flange 66. In another embodiment (as shown in FIG. 4), the flange 70 can be omitted, and band clamps 82 can be used to secure the flexible enclosure 54 together.

The metal collar 42 clamps down on the enclosure 54 to attach the enclosure 54 to the support bracket 14 and to further stiffen the support bracket end of the flexible enclosure 54.

Various other features and advantages of the invention will be apparent from the following claims.

The invention claimed is:

1. An end fitting for a wire rope with a diameter, the fitting being adapted to securely hold and to attach the wire rope to a structure, the end fitting comprising a stiff support adapted to be connected to the structure and adapted to securely hold the wire rope end, an elongated flexible enclosure surrounding the wire rope, said flexible enclosure having a length more than 2 times longer than said diameter, and means for attaching the enclosure to the stiff support comprising a stiff collar having an inside tapered bore that mates with the exterior taper on the enclosure.

2. An end fitting in accordance with claim 1 wherein said flexible enclosure is made of an elastomer toughened thermoplastic material and said support is made of steel.

3. An end fitting in accordance with claim 2 wherein said flexible enclosure is made of two components mixed together and cured, the two components comprising one component made of caprolactam and a prepolymer in the form of a polyl based on polyether, and the other component made of a curing catalyst and caprolactam.

4. An end fitting in accordance with claim 1 wherein said the stiff collar is split into two collar pieces that are adapted to be secured together around the enclosure, the stiff collar having an inside tapered bore that mates with the exterior taper on the enclosure, and means for closing the collar split pieces together, said collar closing means comprising each of the collar pieces having a radially outwardly extending flange extending the length of the collar.

5. An end fitting in accordance with claim 1 wherein said flexible enclosure is split into two pieces that are adapted to be secured together around the wire rope.

6. An end fitting in accordance with claim 5 wherein said enclosure is a cone split into two pieces adapted to be placed over the wire rope, and wherein said enclosure further includes means for securing the enclosure split pieces together.

7. An end fitting in accordance with claim 6 wherein said cone pieces have a radially outwardly extending flange extending the length of the enclosure.

8. An end fitting in accordance with claim 1 wherein said enclosure is tapered, with the larger end of said tapered enclosure being attached to said end fitting attachment by said enclosure attaching means.

9. An end fitting in accordance with claim 1 wherein said enclosure further has a grease groove that extends inside substantially the length of the interior of the enclosure.

10. An end fitting in accordance with claim 1 wherein said wire rope has a diameter, and wherein said flexible enclosure has a length more than 6.5 times longer than said diameter.

11. An end fitting for wire rope adapted to attach the wire rope to a surface, the end fitting comprising a stiff support adapted to be connected to the surface and adapted to securely hold the wire rope, an externally tapered elongated flexible enclosure adapted to surround the wire rope, the enclosure being split into two enclosure pieces that are adapted to be secured together around the wire rope, and means for closing the enclosure split pieces together, and means for attaching the larger end of the tapered enclosure to the stiff support comprising a stiff collar, the stiff collar being split into two collar pieces that are adapted to be secured together around the enclosure, the stiff collar having an inside tapered bore that mates with the exterior taper on the enclosure, and means for closing the collar split pieces together.

12. An end fitting in accordance with claim 11 wherein said flexible enclosure is made of an elastomer toughened thermoplastic material and said support is made of steel.

13. An end fitting in accordance with claim 11 wherein said flexible enclosure is made of two components mixed together and cured, the two components comprising one component made of caprolactam and a prepolymer in the form of a polyl based on polyether, and the other component made of a curing catalyst and caprolactam.

14. An end fitting in accordance with claim 11 wherein said enclosure further has a grease groove that extends inside substantially the length of the interior of the enclosure.

15. An end fitting in accordance with claim 11 wherein said wire rope has a diameter, and wherein said flexible enclosure has a length more than 2 times longer than said diameter.

16. An end fitting in accordance with claim 15 wherein said wire rope has a diameter, and wherein said flexible enclosure has a length more than 6.5 times longer than said diameter.

17. An end fitting in accordance with claim 11 wherein said enclosure closing means comprises each of the enclosure pieces having a radially outwardly extending flange extending the length of the enclosure.

18. An end fitting in accordance with claim 11 wherein said collar closing means comprises each of the collar pieces having a radially outwardly extending flange extending the length of the collar.

* * * * *